US011029329B2

(12) United States Patent
Sadeghian Marnani

(10) Patent No.: US 11,029,329 B2
(45) Date of Patent: Jun. 8, 2021

(54) METHOD OF AND SYSTEM FOR DETECTING STRUCTURES ON OR BELOW THE SURFACE OF A SAMPLE USING A PROBE INCLUDING A CANTILEVER AND A PROBE TIP

(71) Applicant: Nederlandse Organisatie voor toegepast-natuurwetenschappelijk onderzoek TNO, s-Gravenhage (NL)

(72) Inventor: Hamed Sadeghian Marnani, Nootdorp (NL)

(73) Assignee: Nederlandse Organisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 0 days.

(21) Appl. No.: 16/477,845

(22) PCT Filed: Jan. 12, 2018

(86) PCT No.: PCT/NL2018/050024
§ 371 (c)(1),
(2) Date: Jul. 12, 2019

(87) PCT Pub. No.: WO2018/132008
PCT Pub. Date: Jul. 19, 2018

(65) Prior Publication Data
US 2019/0369140 A1    Dec. 5, 2019

(30) Foreign Application Priority Data
Jan. 13, 2017  (EP) .................................. 17151440

(51) Int. Cl.
*G01Q 60/30*    (2010.01)
*G01N 29/06*    (2006.01)
(Continued)

(52) U.S. Cl.
CPC ......... *G01Q 60/30* (2013.01); *G01N 29/0681* (2013.01); *G01N 29/2418* (2013.01); *G01Q 60/38* (2013.01)

(58) Field of Classification Search
CPC ........ G01Q 60/30; G01Q 60/38; G01Q 60/32; G01N 29/0681; G01N 29/2418; G01N 2291/0427; G01N 29/022; G01N 29/265
(Continued)

(56) References Cited
U.S. PATENT DOCUMENTS 5,319,977 A * 6/1994 Quate .................... G01H 3/125
310/336
2005/0056782 A1    3/2005 Shekhawat et al.
(Continued)

OTHER PUBLICATIONS

Dravid et al., "Seeing the Invisible: Non-Destructive Subsurface Nanosclae Metrology with Scanning Near-Field Ultrasound Holography," Solid State Technology, Insights for Electronics Manufacturing, pp. 1-8 (Jun. 21, 2016).
(Continued)

*Primary Examiner* — Michael Maskell
(74) *Attorney, Agent, or Firm* — Leydig, Voit & Mayer, Ltd.

(57) ABSTRACT

The present document relates to a method of detecting structures on or below the surface of a sample using a probe including a cantilever and a probe tip, the cantilever being characterized by one ore more normal modes of resonance including a fundamental resonance frequency, the method including: applying, using a transducer, a vibrational input signal to the sample; sensing, while the probe tip is in contact with the surface, an output signal indicative of motion of the probe tip due to vibrations at the surface induced by the vibrational input signal; wherein the vibrational input signal comprises at least a first signal component having a frequency within a range of 10 to 100 megahertz; and wherein the vibrational input signal is amplitude modulated using at least a second signal component having a modulation frequency below 5 megahertz. The present document further relates to a scanning probe microscopy method.

21 Claims, 7 Drawing Sheets

(51) Int. Cl.
*G01N 29/24* (2006.01)
*G01Q 60/38* (2010.01)

(58) Field of Classification Search
USPC .............................................. 850/21, 33, 36
See application file for complete search history.

(56) References Cited

U.S. PATENT DOCUMENTS

| | | | |
|---|---|---|---|
| 2008/0276695 A1* | 11/2008 | Prater | G01N 29/0681 73/105 |
| 2011/0036170 A1* | 2/2011 | Shekhawat | G01N 29/0663 73/603 |
| 2015/0228065 A1 | 8/2015 | Biring | |

OTHER PUBLICATIONS

Kolosov et al., "Nanometre Scale 3D Nanomechanical Imaging of Semiconductor Structures from Few nm to Sub-Micrometre Depths," Physics Department, Lancaster University, Lancaster, LA1 4YB, UK, 3 pages (No Date).

Sean Hand/Bruker Corporation, "Silicon Nanowire Hybrid Metrology for the 7nm Node," Bruker Webinar, Bruker Nano Surfaces Division, 27 pages (No Date).

European Patent Office, International Search Report in corresponding International Application No. PCT/NL2018/050024 dated Apr. 19, 2018 (3 pages).

\* cited by examiner

METHOD OF AND SYSTEM FOR DETECTING STRUCTURES ON OR BELOW THE SURFACE OF A SAMPLE USING A PROBE INCLUDING A CANTILEVER AND A PROBE TIP

CROSS-REFERENCE TO RELATED APPLICATIONS

This patent application is a U.S. National Phase of PCT International Application No. PCT1NL2018/050024, filed Jan. 12, 2018, which claims priority to European Application No. 17151440.9, filed Jan. 13, 2017, which are both expressly incorporated by reference in their entireties, including any references contained therein.

FIELD OF THE INVENTION

The present invention is directed at a method of detecting structures on or below the surface of a sample using a probe including a cantilever and a probe tip, the cantilever being characterized by a cantilever resonance frequency, the method including: applying, using a transducer, a vibrational input signal to the sample; and sensing, while the probe tip is in contact with the surface, an output signal indicative of motion of the probe tip due to vibrations at the surface induced by the vibrational input signal. The invention is further directed at a scanning probe microscopy system.

BACKGROUND

The ongoing objective of producing smaller and smaller devices in semiconductor industry, to meet the needs with respect to enabling higher performances of such devices, continuously provides new challenges in various related fields of technology. For example, the production of such devices requires inspection during production, which in turn requires imaging technology that is capable of making these devices visible.

Where originally, relatively basic types of semiconductor structures were fabricated that already allowed major steps forward in the electronics industry, the structures not only become smaller, but also more sophisticated. In earlier times, semiconductor elements included various structures of stacked semiconductor layers, occasionally including some three dimensional features fabricated by means of etching or similar techniques. Such devices are still very popular and used for many kinds of applications. More recently, the semiconductor devices include more complex three dimensional (3D) structures, having typical dimensions of tens of nanometers. This development is not expected to cease yet, and thus the creation of even more complex 3D structures with overlapping and interacting semiconductor features at even smaller dimensions is foreseeable.

One particular class of semiconductor devices that has been developed in the past years are the multigate devices, or multiple gate field effect transistors (MuGFET). The devices include for example fin field effect transistors (finFET) or gate-all-around field effect transistors (GAA or GAA-FET), wherein a gate surrounds a transistor channel on multiple sides (or all sides in a GAA device). Using the finFET as an example, this device gives a knob to increase the performance just by increasing the height of the fin (i.e. the charge carrier between source and drain wherein the conductive channel is formed by biasing the gate). This trick has been used for fins having a thickness of 10 nm and 7 nm, however, eventually this technology may reach the limitation in electrostatic integrity. A 5 nm node technology (i.e. fin thickness of 5 nanometer) will have to adopt a lateral nanowire configuration of e.g. horizontally or vertically parallel nanowires (gate-all-around, GAA) to overcome this issue.

The contacts, gates and nanowire fins (vertically stacked) for 5 nm node devices consist of structures of stacked features in several layers. Such structures may be embedded or buried underneath a surface layer, e.g. a hard inflexible material layer such as a ceramic insulating layer or a further semiconductor layer. Production methods for enabling large scale production of such devices, require inspection methods to become feasible. Standard atomic force microscopy methods have been applied to measure and inspect surface topographies of nanowires. However such methods only allow imaging and mapping of the surface features, and do not enable measuring of subsurface structures, such as buried embedded nanometer scale semiconductor devices underneath hard material layers. In some cases, such structures include nanowires or other nanometer scale elements that are buried underneath layers of tens of nanometers thickness, e.g. polysilicon or oxide layers.

Subsurface imaging of various layers on nanometer scale therefore becomes a crucial capability for the measurement of critical dimension (CD) uniformity, for defect detection, for alignment purposes (e.g. overlay measurement or wafer alignment) and for edge detection or edge placement. In particular, to be useable in a wide variety of applications, such methods must provide a high resolution in terms of differences in layer hardness, as well as being able to be applied through hard surface layers. Presently available methods fall short in providing useful technologies that allow such inspection. One alternative is the application of high energy electron beams in transmission electron microscopy (TEM) methods. However, such methods are damaging on the devices themselves, and are therefore not an ideal solution.

SUMMARY OF THE INVENTION

It is an object of the present invention to provide a method and apparatus for enabling detection of structures on or below the surface of a sample, which structures may have one or more characteristic dimensions of only a few nanometers or less, and which may even be covered by one or more overlapping dense or hard layers, for example further semiconductor layers.

To this end, in accordance with a first aspect, there is provided herewith a method of detecting structures of nanometer size semiconductor elements on or below the surface of a sample using a probe including a cantilever and a probe tip, the cantilever being characterized by one or more normal modes of resonance including a fundamental resonance frequency, the method including: applying, using a transducer, a vibrational input signal to the sample; and sensing, while the probe tip is in contact with the surface, an output signal indicative of motion of the probe tip due to vibrations at the surface induced by the vibrational input signal; wherein the vibrational input signal comprises at least a first signal component having a frequency within a range of 10 megahertz to 10 gigahertz; and wherein the vibrational input signal is amplitude modulated using at least a second signal component having a modulation frequency below 5 megahertz.

Likewise, alternatively, in accordance with a second aspect, there is provided herewith a method of detecting structures of nanometer size semiconductor elements on or below the surface of a sample using a probe including a cantilever and a probe tip, the cantilever being characterized by one or more normal modes of resonance including a fundamental resonance frequency, the method including: applying, using a transducer, a vibrational input signal to the probe; and sensing, while the probe tip is in contact with the surface, an output signal indicative of motion of the probe tip due to vibrations at the surface induced by the vibrational input signal; wherein the vibrational input signal comprises at least a first signal component having a frequency within a range of 10 megahertz to 10 gigahertz; and wherein the vibrational input signal is amplitude modulated using at least a second signal component having a modulation frequency below 5 megahertz.

The method of the present invention as described above enables to image buried nanostructures with very high lateral and vertical resolution. The method is non-destructive and may be applied to a variety of use cases, including stiff-stiff and stiff-compliant interfaces and multilayers. A depth sensitivity of several hundreds of nanometers has been demonstrated to be achievable. In accordance with the first aspect, the vibrational input signal may be applied via the sample. In accordance with the second aspect, the vibrational input signal may be applied via the probe. The vibrational input signal is not applied via both the sample and the probe, but exclusively via one of the sample or the probe.

Without being bound by theory, in the method in accordance with the first aspect, the extreme high sensitivity of the method is considered to be achieved due to application of the very high frequency vibrational input signal of 10 megahertz (MHz) to 10 gigahertz (GHz) to the sample, in combination with the amplitude modulated signal at the much lower frequency of 5 Mhz or smaller. The mechanical characteristics of the cantilever, which allow the probe to be more sensitive at certain frequencies, cause the probe to act as a very stiff element at the very high frequencies applied to the sample. The amplitude modulated vibrational input signal causes the sample to be periodically pressed against the probe tip at the modulation frequency, causing indentation of the surface. The modulation frequency is in a range wherein it can be well sensed using the probe, to provide the output signal via the probe tip in contact with the surface.

Thus at very high frequencies, in the first aspect, the vibrating sample elastically "indent" itself against the dynamically frozen cantilever tip. The cantilever is dynamically frozen because of the very high impedance at these very high frequencies. But the sample indent itself to the tip, which thereby changes the tip-sample distance. The force versus distance characteristic is however non-linear with respect to the force between the probe tip and the sample. Owing to the sharp nonlinearity of the tip-sample force-versus-distance dependence F(z), such indentation, repeated with ultrasonic frequency, reveals itself as an additional force acting on the cantilever. This is detected in the present invention with an extremely force sensitive atomic force microscopy cantilever, at low frequencies.

Likewise, in the method in accordance with the second aspect, without being bound by theory, the extreme high sensitivity of the method is considered to be achieved due to application of the very high frequency vibrational input signal of 10 megahertz (MHz) to 10 gigahertz (GHz) to the probe, in combination with the amplitude modulated signal at the much lower frequency of 5 Mhz or smaller. The mechanical characteristics of the cantilever, which allow the probe to be more sensitive at certain frequencies, cause the probe to act as a very stiff element at the very high frequencies applied to the probe. The amplitude modulated vibrational input signal causes the probe tip to be periodically pressed against the sample at the modulation frequency, causing indentation of the surface. The modulation frequency is in a range wherein it can be well sensed using the probe, to provide the output signal via the probe tip in contact with the surface.

Thus at very high frequencies, in the second aspect, the vibrating dynamically frozen cantilever tip (i.e. probe tip) causes itself to be elastically "indented" against the sample. The cantilever is dynamically frozen because of the very high impedance at these very high frequencies. But due to the low frequency amplitude modulated signal, the probe tip indents itself against the sample surface, which thereby changes the tip-sample distance. The force versus distance characteristic is however non-linear with respect to the force between the probe tip and the sample. Owing to the sharp nonlinearity of the tip-sample force-versus-distance dependence F(z), such indentation, repeated with ultrasonic frequency, reveals itself as an additional force acting on the cantilever. This is detected in the present invention with an extremely force sensitive atomic force microscopy cantilever, at low frequencies.

In both the first and the second aspect, the modulation frequency being below 5 MHz is within the frequency range of the lower few resonant modes (normal modes) of the cantilever. The cantilever is sufficiently sensitive to signal components in this frequency range. Therefore, by measuring and analyzing probe tip motion using a suitable sensor and analysis system, the abovementioned additional force that results from the indentation and the non-linearity of the force-distance characteristic can be measured due to the second signal component with modulation frequency below 5 MHz. The amount of indentation however is influenced not only by the surface layer of the sample, but also by the layers underneath. Hence, analysis of the output signal provided by the sensor that monitors the probe tip motion, allows detection of the structures on and below the surface of the sample. This can be done at the graphical resolution of the AFM system, thereby allowing the detection of even the smallest features of the semiconductor device (0.1 nanometer (nm) and larger) underneath the surface of the sample.

In accordance with some embodiments of either one of the first and the second aspect, the second signal component has a modulation frequency within a range of 20% from at least one of the normal modes of resonance of the cantilever. In particular, by selecting the modulation frequency to be close to a normal mode of resonance of the cantilever, the signal-to-noise ratio (SNR) of the system improves, thereby enhancing the sensitivity and enabling detection of features at larger depths within the sample. Preferably, the modulation frequency is chosen to be close to or at the fundamental frequency; however, also a modulation frequency close to any of the other normal modes may be applied to improve the SNR. Therefore, in accordance with various embodiments, the modulation frequency is a times the fundamental frequency, wherein a is within a range of 0.8 to 1.2, preferably wherein a is within a range of 0.95 to 1.05, more preferably wherein a is 1.00. Hence, the modulation frequency may be within 20%, or preferably within 10%, or even more preferably within 5%, or ideally be at the fundamental frequency. The cantilever is most sensitive to vibrational signals at the fundamental frequency.

The sensor for sensing probe tip motion, may be any kind of sensor that is suitable for being used for this purpose in an atomic force microscopy system. For example, an optical beam such as a laser beam may be impinged on the back of the probe tip from where it specularly reflects onto a photo detector array. Any motion of the probe tip results in a motion of the spot formed by the reflecting beam on the photo detector array, and the location of this spot on the array can be monitored and is indicative of probe tip motion. Other types of sensors or readout methods may also be implemented, such as for example (but not limited to) capacitive sensors, piezo resistive sensors, integrated optics, etcetera.

In accordance with some embodiments of either one of the first and the second aspect, the step of sensing of the output signal comprises a step of measuring signal characteristics of the output signal at or near a measurement frequency. For example, filters or other means may be applied to let through only a selected range of frequencies around the measurement frequency, or even a very small frequency band, to an analyzer system. Alternatively or additionally, a Fourier transform of the output signal may be obtained to enable monitoring of one or more selected measurement frequencies. As may be appreciated, alternative manners are available to the skilled person and are useable for tuning into or passing through only selected frequencies of the output signal. In particular, the signal characteristics determined from the sensor signal or output signal include at least one of a phase or an amplitude of the output signal, i.e. at least of the signal components at the measurement frequency or frequencies.

In accordance with some embodiments of either one of the first and the second aspect, the measurement frequency is within a range of 20% from at least one of the normal modes of resonance of the cantilever. As explained, around these normal modes the cantilever is more sensitive to sensed vibrations acting on the probe tip, thus monitoring the output signal at or around these frequencies provides improved SNR. In accordance with particular one of these embodiments, the measurement frequency is b times the fundamental frequency of cantilever resonance, wherein b is within a range of 0.8 to 1.2, preferably wherein b is within a range of 0.95 to 1.05, and more preferably wherein b is 1.00. Thus the measurement frequency may be within 20%, or preferably within 10%, or even more preferably within 5%, or ideally be at the fundamental frequency. The cantilever is most sensitive to vibrational signals at the fundamental frequency. In accordance with some specific embodiments, the measurement frequency is equal to or within 5% from the modulation frequency. As stated above, the modulation frequency may likewise be selected to be close to or at the normal modes of the cantilever, or preferably the fundamental frequency thereof. Selecting both the modulation frequency and the measurement frequency to be substantially equal, results in an optimal SNR where these frequencies are close to the fundamental frequency.

In accordance with some embodiments of either one of the first and the second aspect, the method of the invention further comprises a step of scanning the probe tip relative to the surface in a direction parallel with the surface for performing at least one of a line scan or an area mapping. By scanning the probe tip across the surface of the sample, a line scan or area mapping may be obtained, from which an image may be created or which allows to perform all kinds of measurements on e.g. semiconductor devices embedded underneath the surface.

The method of the present invention of either one of the first and the second aspect is not limited to the detection of subsurface features of semiconductor elements, but may be applied much more broadly to the detection of other sub-surface structures. However, the application for the purpose of detecting subsurface features of semiconductor elements, is certainly a field of application wherein the present invention provides particular advantages, as has been explained above. In particular, enabling device inspection during manufacturing, in a non-destructive or invasive manner, enables the method to become useable as part of large scale production methods of such semiconductor devices. This, thereby, contributes to the further size reduction of semiconductor elements and the performance enhancements connected therewith. Therefore, in accordance with some embodiments, the sample includes at least one, or a combination or all of: a semiconductor structure embedded within the sample, a multilayer semiconductor structure or element, a three dimensional semiconductor structure, such as a gate-all-around semiconductor device or a fin field effect transistor structure; a structure comprising structural features having at least one size dimension smaller than 10 nanometers.

The method of the present invention of either one of the first and the second aspect enables to detect structures of nanometer size semiconductor elements underneath either or both soft and hard material cover layers. The method allows imaging underneath layers with an achievable hardness range of covering layers of 1 MPa to tens of GPa (e.g. 1 MPa to 40 GPa). Moreover, measurable differences in hardness between contiguous layers or structures (i.e. the hardness resolution of the method), in terms of contact stiffness, the method allows to detect a change down to 0.1%. The resolution limits with respect to size can be down to 1 nm, and the depth range of the method (i.e. the achievable depths that may be imaged below the surface) is at least 1.6 micrometers.

In accordance with a third aspect of the present invention, there is provided a scanning probe microscopy system for detecting structures on or below the surface of a sample, comprising a probe for scanning the sample surface, wherein the probe comprises a probe tip mounted on a cantilever, the cantilever being characterized by one ore more normal modes of resonance including a fundamental resonance frequency, and wherein the probe is mounted on a sensing head arranged for bringing the probe tip in contact with the sampling surface, the system further comprising a transducer for applying an vibrational input signal to the sample, and a probe deflection sensor for producing an output signal indicative of motion of the probe tip due to vibrations at the surface induced by the vibrational input signal; wherein the transducer is configured for producing the vibrational input signal such as to comprise at least a first signal component having a frequency within a range of 10 megahertz to 10 gigahertz, and wherein the transducer is configured for amplitude modulating the vibrational input signal using at least a second signal component having a modulation frequency below 5 megahertz. This system in accordance with the third aspect for example enables to perform a method in accordance with the first aspect, as is described above. The limits of the modulation frequency are presently limited to the detectable bandwidth of the AFM instrument. If further developed instruments allow for higher bandwidths then the modulation and measurement frequency may be further increased, without departing from the present invention.

In accordance with a fourth aspect of the present invention, there is provided a scanning probe microscopy system for detecting structures on or below the surface of a sample, comprising a probe for scanning the sample surface, wherein the probe comprises a probe tip mounted on a cantilever, the cantilever being characterized by one ore more normal modes of resonance including a fundamental resonance frequency, and wherein the probe is mounted on a sensing head arranged for bringing the probe tip in contact with the sampling surface, the system further comprising a transducer for applying an vibrational input signal to the probe, and a probe deflection sensor for producing an output signal indicative of motion of the probe tip due to vibrations at the surface induced by the vibrational input signal; wherein the transducer is configured for producing the vibrational input signal such as to comprise at least a first signal component having a frequency within a range of 10 megahertz to 10 gigahertz, and wherein the transducer is configured for amplitude modulating the vibrational input signal using at least a second signal component having a modulation frequency below 5 megahertz. This system in accordance with the fourth aspect for example enables to perform a method in accordance with the second aspect, as is described above. The limits of the modulation frequency are presently limited to the detectable bandwidth of the AFM instrument. If further developed instruments allow for higher bandwidths then the modulation and measurement frequency may be further increased, without departing from the present invention.

In accordance with some embodiments, this system further comprises a motion actuator for enabling motion of the probe relative to the sample, for scanning the probe tip relative to the surface in a direction parallel with the surface for performing at least one of a line scan or an area mapping. The probe deflection sensor may be an optical sensor cooperating with an optical beam impinging on the back of the probe tip, as is described above.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
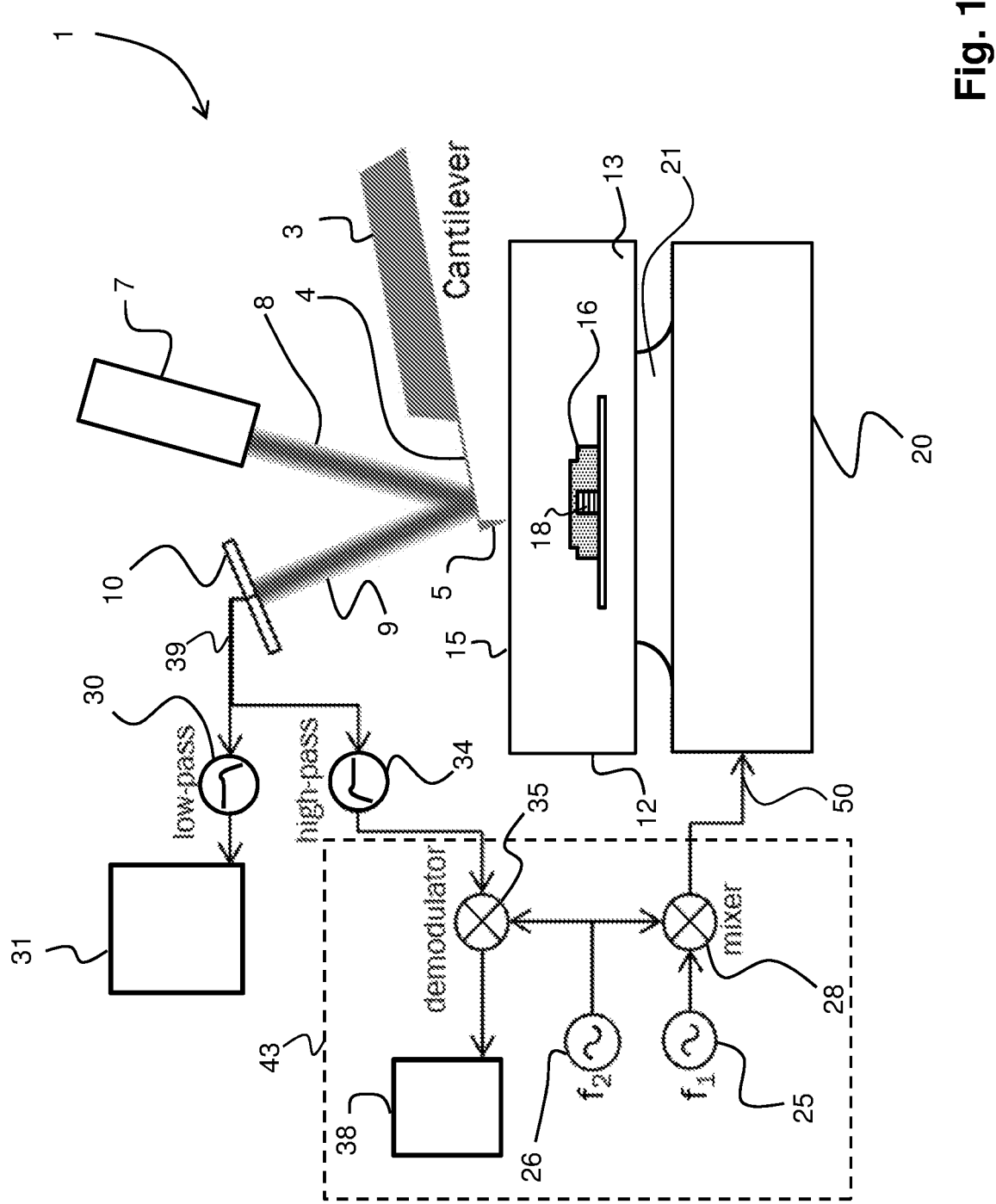
FIG. 1 schematically illustrates an atomic force microscopy system (AFM)
Figure 2:
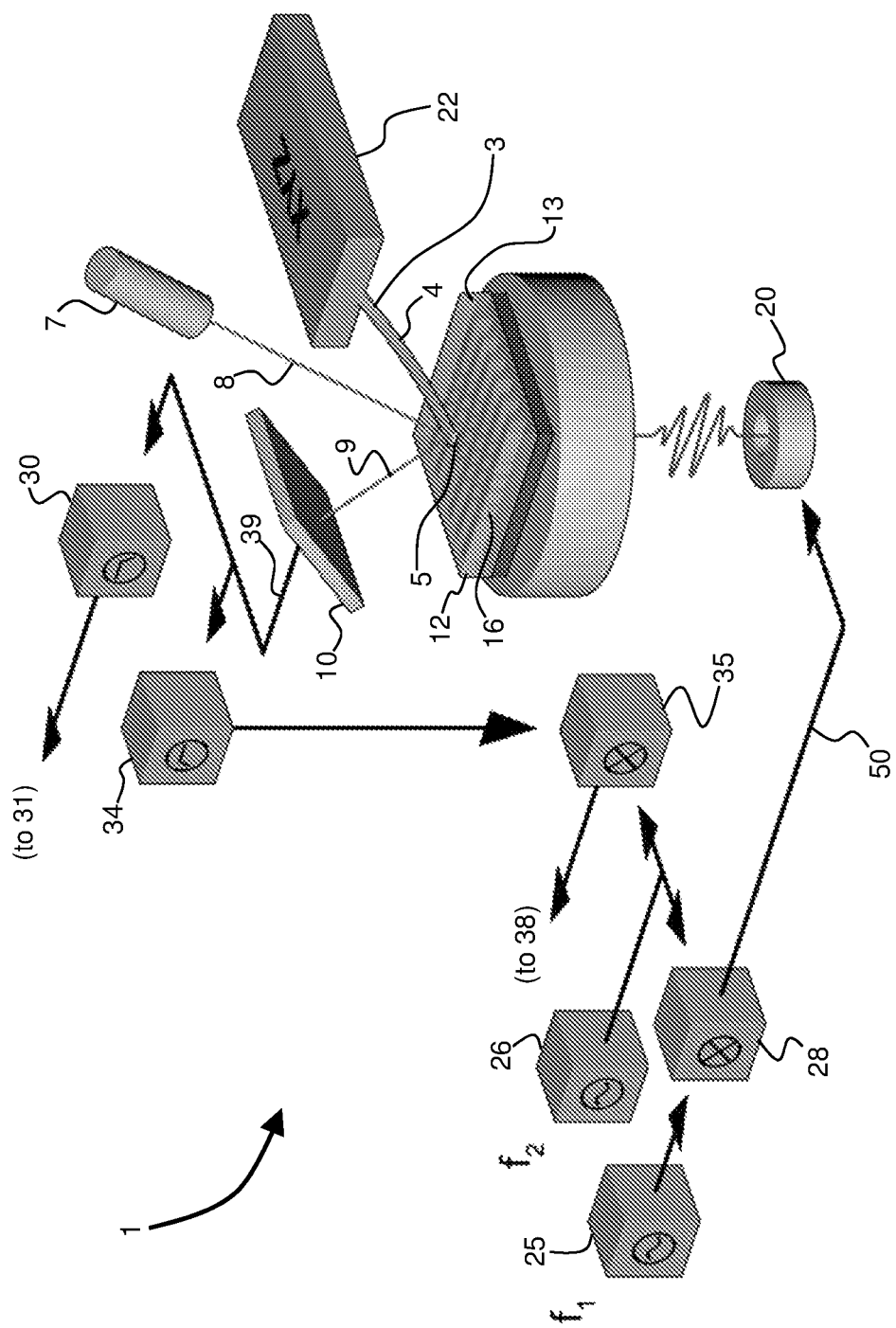
FIG. 2 schematically illustrates an atomic force microscopy system (AFM)

FIG. 1 schematically illustrates an atomic force microscopy system (AFM) 1, suitable for use in a method of the present invention and in accordance with an embodiment of the present invention. Another impression of the system 1 of FIG. 1 is illustrated in FIG. 2, reciting corresponding reference numerals. The system 1 comprises a probe 3 having a cantilever 4 and a probe tip 5. The probe tip 5 is brought in contact with a surface 15 of a sample 12. A light source 7, typically a laser, provides an optical signal beam 8 that is incident on the back of the probe tip 5. A reflected optical beam 9 is received by an optical sensor 10. Any vibration of the probe tip 5 perpendicular to the surface 15 will result in a deflection of the reflected optical beam 9. This deflection can be accurately determined by means of optical sensor 10 which provides an (electrical) output signal 39 for further analysis. In accordance with the present invention, the system 1 may be used for subsurface measurements as will be described below. However, optionally and additionally the system 1 may simultaneously be used for performing surface topography measurements on surface 15, if so desired for the respective application. Such surface topography measurements may be performed simultaneously with the subsurface measurements.

The detection method of the present invention applies an vibrational input signal to the sample 12, which results in vibrations of the sample 12 that are measurable at the surface 15. The vibrational input signal comprises a high frequency signal component of 10 to 100 MHz, which causes the cantilever 4 to exhibit a very high dynamic stiffness, as explained earlier. The vibrational input signal is amplitude modulated using a further signal component of much lower frequency (e.g. below 5 MHz). These vibrations thereby result in the sample surface 15 to indent against the probe tip 5, which may be sensed by the probe tip 5 with great accuracy due to non-linearity of the force-versus-distance characteristics.

In the system 1 of FIG. 1, for applying the input signal to sample 12, a transducer 20 is arranged underneath the sample 12. A coupling medium 21 (e.g. a liquid, an oil or grease (e.g. Vaseline)) provides a low resistance coupling between the transducer 20 and the sample 12. This allows an vibrational input signal produced by the transducer 20 to penetrate the sample 12 from the back side thereof, e.g. in as in the set-up illustrated in FIG. 1. In respect of this, it is noted that it is not essential to the invention to apply the acoustic signal from the back side of the sample 12. The transducer 20 for applying the vibrational input signal may be located elsewhere relative to the semiconductor element 12, enabling the vibrational input signal to be applied from any desired direction (e.g. above, below, from aside, or even through another part or entity).

The sample 12 in FIG. 1 consists of a substrate material 13 having embedded therein one or more or many semiconductor elements 16. The substrate material 13 is itself illustrated as a single block of material, however this has been done in order to not unnecessarily complicate the illustration of FIG. 1. Substrate material 13 may consist of several layers of various materials, dependent on the application. For example, during fabrication of the semiconductor element 16, it may be advantageous to deposit the substrate material 13 layer-by-layer. The layers of substrate material 13 may be of a same material (e.g. a ceramic insulating material), or may comprise various layers of different materials. For example, the substrate material 13 may comprise various conductive layers forming conductive paths to electrodes of the semiconductor element 16, which may functionally be combined with ceramic insulating layers, or passivation layers, or other layers that may be part of the enclosing material surrounding the semiconductor device 16. Substrate material may also, as illustrated, be of a single material where this is expedient.

FIG. 1 shows a single semiconductor element 16 buried within substrate material 13, however, there may be multiple devices such as semiconductor element 16 be embedded within the substrate material 13. For example, sample 12 may be a wafer containing many devices such as semiconductor element 16 formed thereon, all or many embedded or at least partly embedded within the substrate material 13. The or these semiconductor elements 16 may be buried underneath one or more material layers of substrate material 13.

The method of the invention may be applied as a last step of the fabrication process, or even thereafter as a separate test independent from a fabrication method. However, in view of the fact that the method of the present invention is non-destructive and non-damaging, the method may also be applied at any moment during fabrication. Therefore, the sample 12 in FIG. 1 may be—as illustrated—a fully manufactured semiconductor element 16 (e.g. on a wafer), or it may alternatively be a semi-manufactured semiconductor element that may or may not receive additional layers later on.

The semiconductor element 16 may for example be a multigate semiconductor device, such as a fin field effect transistors (finFET) or gate-all-around field effect transistors (GAA-FET). The semiconductor element 16 may comprise nanometer size structures 18 (i.e. nanostructures) that are to be detected through the surface 15 and material layers of substrate material 13, for the measurement of critical dimension (CD) uniformity, for defect detection, for alignment purposes (e.g. overlay measurement) and for edge detection. As may be appreciated, the semiconductor element 16 illustrated in FIG. 1 (and also the semiconductor elements illustrated in other figures throughout this document) are merely examples.

In accordance with the method, an acoustic vibrational input signal 50 provided by transducer 20. One or more signal generators 29 (see FIG. 3) comprise at least first frequency generator 25, a second frequency generator 26, and a signal mixer 28. The vibrational input signal 50 comprises a high frequency component having a frequency $f_1$ within a range of 10 to 100 MHz, provided by signal generator 25. This high frequency component is amplitude modulated with a low frequency component with frequency $f_2$, which is provided by signal generator 26 and amplitude modulated with the high frequency component $f_1$ using mixer element 28. The transducer 20, via the coupling medium 21 (which in the present example may be Vaseline), sends the acoustic vibration signal into the substrate material 13 of the sample 12. The low frequency component 26 a frequency $f_2$ that is smaller than 5 MHz, to be within the frequency range wherein the lower normal modes of resonance of the cantilever 4 are located. Preferably, the frequency $f_1$ coincides with or is chosen to be very close to the fundamental resonance frequency of the cantilever 4, in order to optimize the signal-to-noise ratio (SNR). Alternatively, the frequency $f_1$ coincides with or is chosen to be very close to any of the normal modes of the cantilever 4. The cantilever 4 has an increased sensitivity to vibrational signals that coincide or are close to the fundamental frequency or any other normal mode of resonance of the cantilever (in particular the lower normal modes).

The method of the present invention may be applied for measurement, detection or imaging of other kinds of buried or embedded features underneath material layers. A particular advantage is that the method enables highly accurate detection through hard or dense material layers, through the combination of the high frequency component (10 to 100 MHz) of the vibrational input signal and the much lower frequency component of the vibrational input signal in the range of the normal modes of cantilever resonance of the cantilever 4. The cantilever 4 has a high dynamic stiffness with respect to the high frequency vibrations, and thus acts as a very stiff lever. The low frequency component amplitude modulation causes the sample to indent itself against the probe tip, providing the desired coupling of the sample vibrations (including all components) into the probe tip 5. The influence of subsurface features, such as even the nanometer size structures 18 (e.g. nanowires in a finFET having a fin thickness of only 5 nanometer) of semiconductor element 16, can therefore be detected by the system 1.

Motion of the probe tip 5, e.g. in a direction perpendicular to surface 15 of sample 12, may be monitored using photo sensor 10, as has been explained above. By scanning the probe 3 relative to the surface 15, such that the probe tip 5 follows a path on the surface 15 of the sample 12, the subsurface topography of the sample 12 becomes measurable and may be mapped. The semiconductor element 16 and any nanometer sized structures 18 thereof may thereby be detected and visualized.

The sensor signal from optical sensor 10, i.e. output signal 39, may be led through low-pass filter 30, the low frequency components of the output signal 39 may be provided to a feedback control system 31. The low pass filter has a cutoff frequency of, for example, around 2-5 kHz. This is fast enough with respect to the scanning speed, but only slightly higher than the sampling rate (e.g. 1024 pixels in 1 second corresponds to a sampling rate of 1.024 kHz). The system 31 uses a proportional-integral-differential (PID) feedback controller 65 (see FIG. 3) and amplifier 66 (see FIG. 3) to control an AFM Z-piezo unit 23 (see FIG. 3) to maintain the probe tip at its setpoint force in feedback mode. Although not the main subject of the present invention, this signal contains optionally desired additional information for performing surface topography mapping of the surface 15, and hence create an image of the surface 15.

Figure 3:
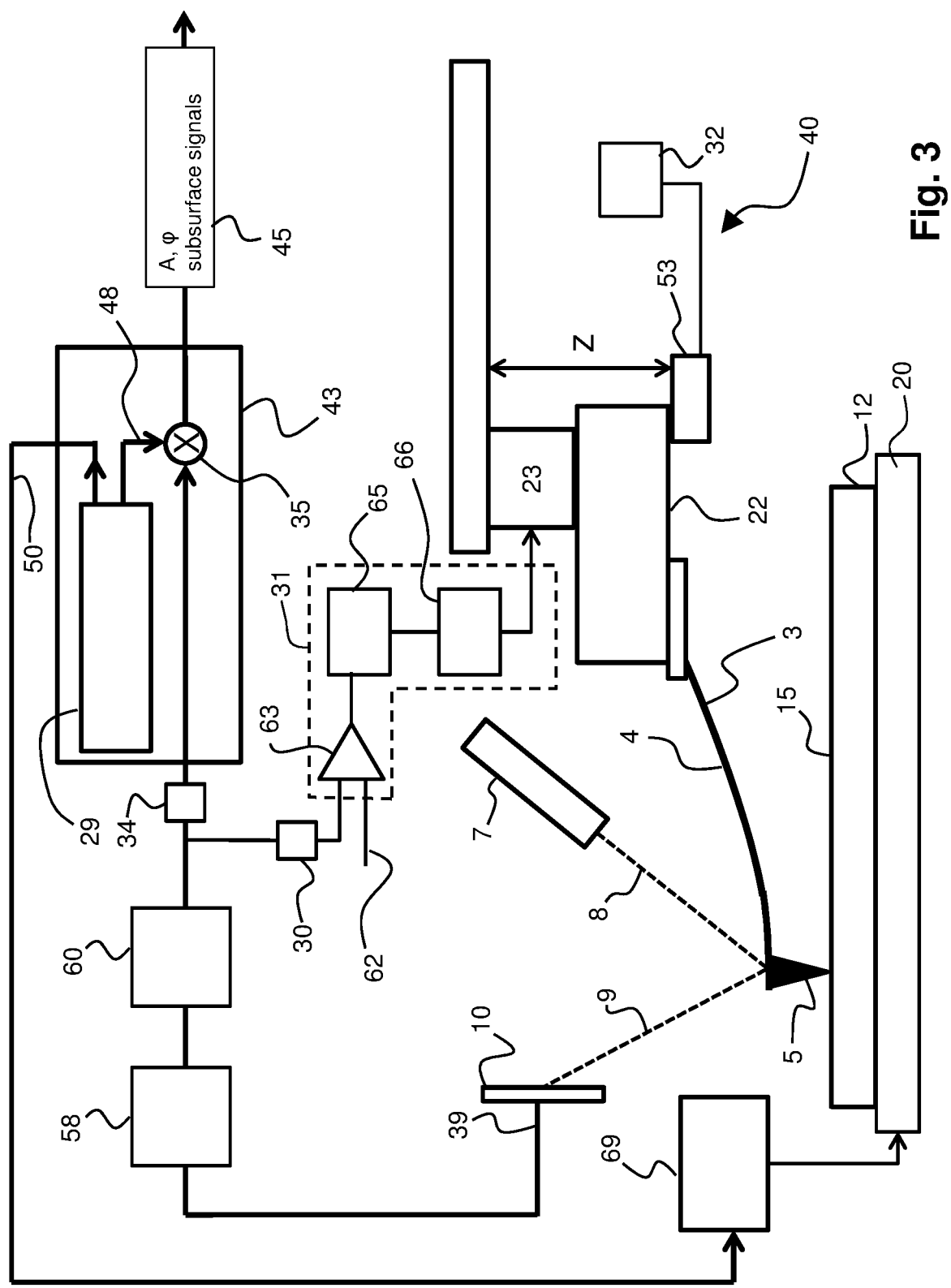
FIG. 3 schematically illustrates an atomic force microscopy system (AFM)

The output signal 39 from the optical sensor 10 is further provided to a high-pass filter 34. The high pass filter 34 may also have a cutoff frequency of for example around 2 kHz, thus thereby transmitting the second fraction of the output signal 39 including the high frequency ultrasound signal (i.e. including component $f_1$) and the low frequency modulation signal (i.e. including component $f_2$) to the demodulator 35. In particular, the step of sensing of the output signal 39 comprises a step of measuring signal characteristics of the output signal 39 at or near a measurement frequency. To benefit from the increased cantilever sensitivity at these frequencies, the measurement frequency may be selected to be close to (e.g. within 20% from, or preferably within 10% or even more preferably within 5% from) one or more of the normal modes of resonance of cantilever 4. Like the modulation frequency $f_2$, the measurement frequency may coincide with one or more of these normal modes—preferably the fundamental frequency of resonance of the cantilever 4. For example, the measurement frequency may be equal to the modulation frequency, and to this end the modulation frequency from signal generator 26 may optionally be applied as further input to the demodulator 35 (for example as illustrated in FIGS. 1-3 (signal 48 in FIG. 3)). Thus, demodulator 35 may optionally further receive the low frequency input signal $f_2$ 26 as a reference signal from the signal generator 29. However, this is not essential and the measurement frequency may be otherwise set to be equal to the modulation frequency, for example in analysis system 38. An output signal of the demodulator 35 is provided to the analysis system 38 which allows to analyze the location dependent output signal 39 to obtain the subsurface measurement information from the motion signal of the probe tip 5. Frequency generators 25 and 26, mixer 28, demodulator 35, and optionally analysis system 38 may form an integral system 43. In FIG. 3, further below, the frequency generators 25 and 26, the mixer 28, and the demodulator 35 are all part of a lockin amplifier 43.

Figure 7:
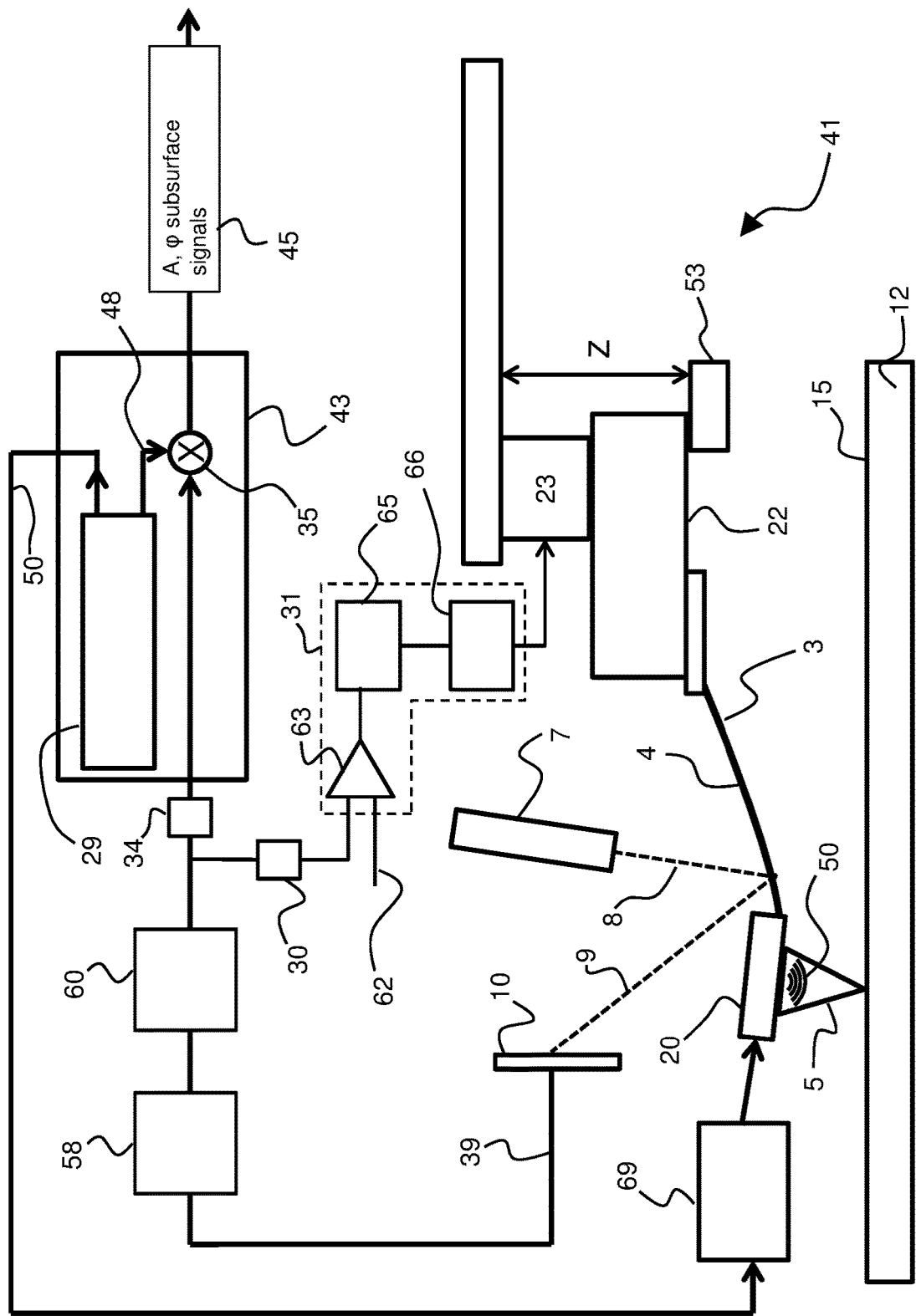
FIG. 7 illustrates an alternative embodiment of an atomic force microscopy system (AFM).

An alternative, FIG. 7 illustrates an alternative embodiment of an atomic force microscopy system (AFM) 41, suitable for use in a method of the present invention in accordance with the second aspect wherein the vibrational input signal is applied to the probe 3. The majority of elements in FIG. 7 is similar to the corresponding elements in FIG. 3, in which cases the elements bear corresponding reference numerals. Different in FIG. 7 is the location of the transducer 20, which is located on the cantilever 4 above the probe tip 5. The transducer 20 may be mounted to a different part of the cantilever 4, or may even be replaced by a completely different stimulation means for applying the vibrational input signal 50. Hence, the invention is not limited to the application of a piezo actuator as transducer 20. In the system of FIG. 7, transducer unit 20 is in contact with the probe tip 5, and receives the input signal 50 that is amplified using power amplifier 69 (such an amplifier 69 can also be seen in FIG. 3). The transducer 20 converts the input signal 50 to an acoustic signal applied to the probe tip 5. In all other aspects, operation of the system of FIG. 7 is similar to the system of FIG. 3, and reference is made to the description of FIG. 3 hereinabove.

An advantage of the application of the vibrational input signal via the probe 3, is that it render the method of the invention to be much more suitable for application in industrial environments. This is due to the fact that the application of a vibrational input signal 50 to a sample 12 is not preferred for larger samples, such as wafers. In that case, vibrational energy must be fed to the whole wafer, which is inefficient in view of the size thereof. The application of the signal to the probe localizes the vibrational input signal to the area where it is required.

Figure 4:
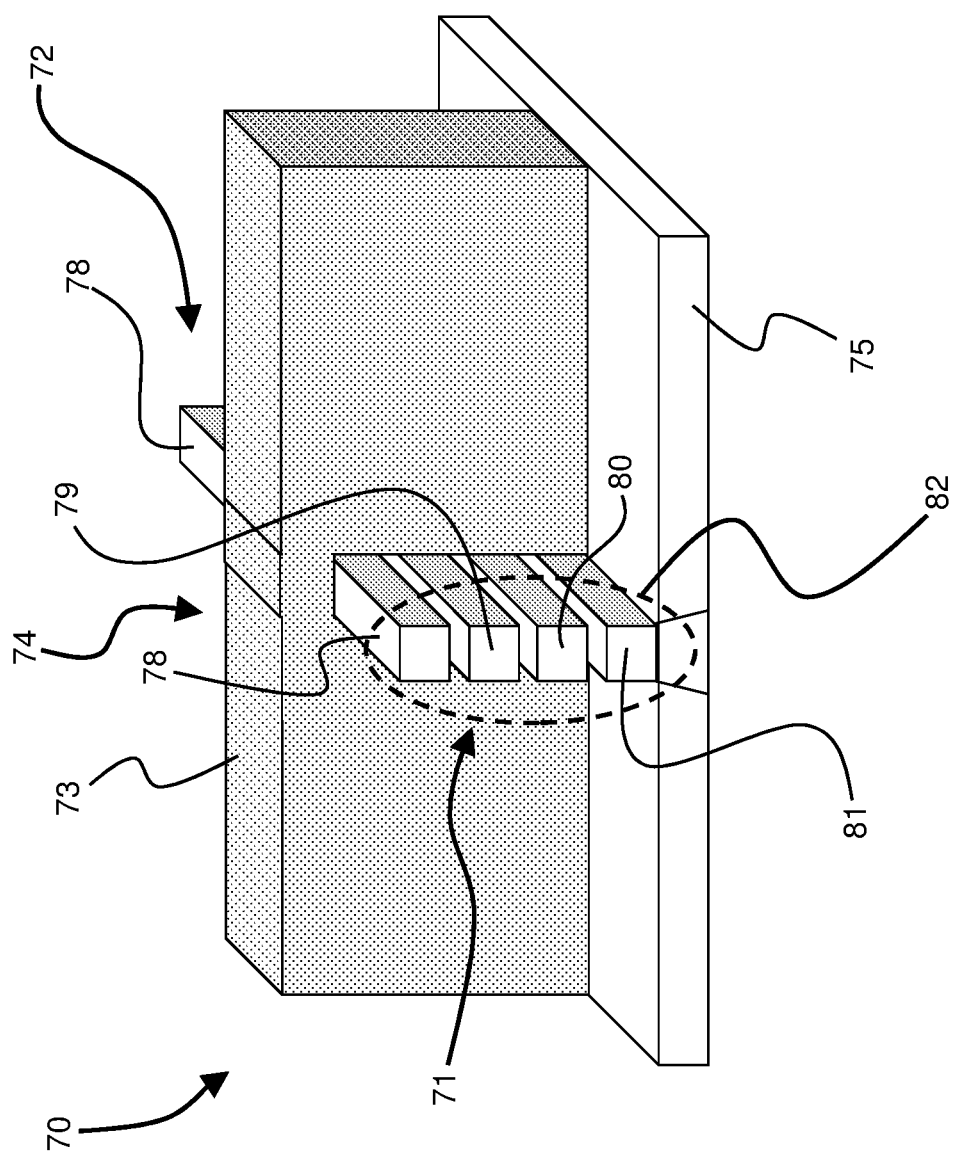
FIG. 4 schematically illustrates a fin type field effect transistor (finFET)

The method of the present invention may be applied such as to perform subsurface imaging at very high resolution. For example, the method is in particular suitable for detecting structures of nanometer size semiconductor elements 16 on or below the surface 15 of a sample 12. FIG. 4 schematically illustrates a fin type field effect transistor (finFET) 70, i.e. an example of a nanometer size semiconductor element that is typically buried within a substrate and that can be imaged using a method and system described in this document. FinFET 70 is a particular example of a multigate device or multi-gate field effect transistor (MuGFET) wherein behavior of the device may be controlled through operation of a plurality of gates. Other types of MuGFETs that characteristically include nanometer size features and that may likewise be visualized using subsurface imaging in accordance with the present invention, are gate-all-around type devices.

In finFET 70 illustrated in FIG. 4, a plurality of nanowires 78, 79, 80 and 81 (typically only a few nanometer in cross section) form a stack 82, which provides for a source electrode 71 and drain electrode 72 on opposite sides of the nanowires 78-81 with respect to a semiconductor fin 73. The fin 73 of finFET 70 form the gate 74 of the device, and operation thereof enables to control the impedance of the device 70 between the source 71 and the drain 72. The device 70 is formed on a substrate 75. Although the smallest features of the finFET 70 are only a few nanometer in size, and even though these structures are buried underneath a layer of semiconductor material, the system and method of the present invention allow for visualization thereof through subsurface imaging.

Figure 5B:
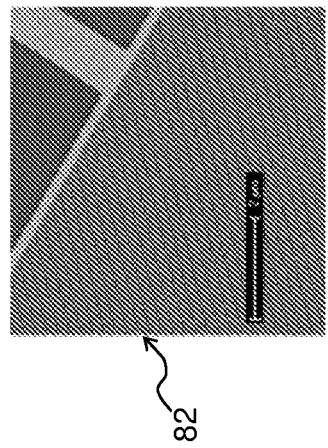
FIGS. 5A and 5B show images of samples taken using a FIB-SEM and a SEM.
Figure 5A:
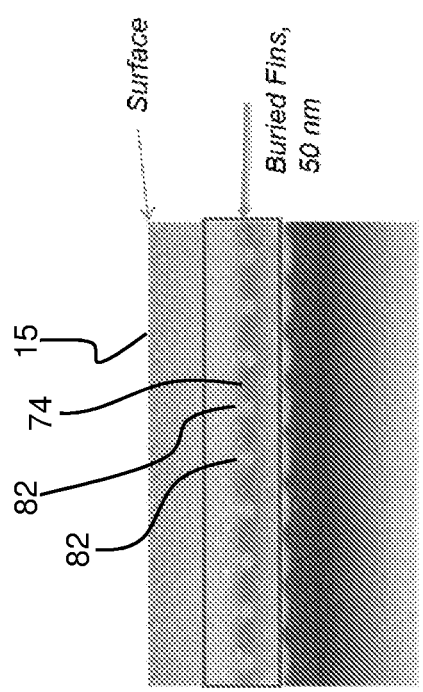

FIG. 5A provides focused ion beam type scanning electron microscope (FIB-SEM) image of a sample 12 including a plurality of finFETs, such as finFET 70 illustrated in FIG. 4. Although focused ion beam type scanning electron microscopy (FIB-SEM) enables imaging in transmission through the sample, such as to visualize subsurface structures, the downside of this type of imaging is that it is inherently destructive to the sample 12. The high energy ions that are used for FIB knock off atoms from the surface, thereby damaging the sample. The image of FIG. 5A reveals the stacks 82 of nanowires and the gates 74 of each of the finFET's buried underneath the surface 15.

FIG. 5B is a regular scanning electron microscope (SEM) image which is obtained using an electron beam on a substrate. To reveal the nanowire stacks 82, the surface 15 and the top layers above the semiconductor device structure have first been removed in order to allow imaging thereof. The image of FIG. 5B is thus provided by destruction of the sample, but serves to The image in FIG. 5B shows a very dense arrangement of nanowire stacks 82. The scale in the image indicates a distance of 2 micrometer, indicating the nanometer size of the wires in the stacks 82 (e.g. of only few to say 10 or 20 nanometers).

Figure 6B:
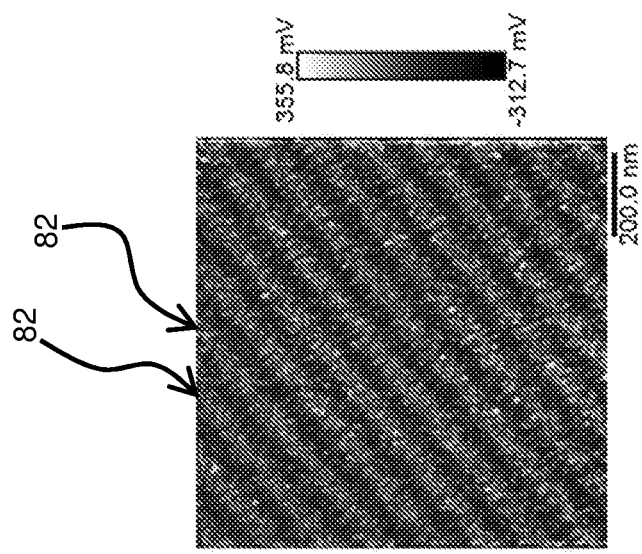
FIG. 6B shows a similar image as FIG. 6A obtained by a method and system of the invention and revealing stacks of nanowires of finFETs.
Figure 6A:
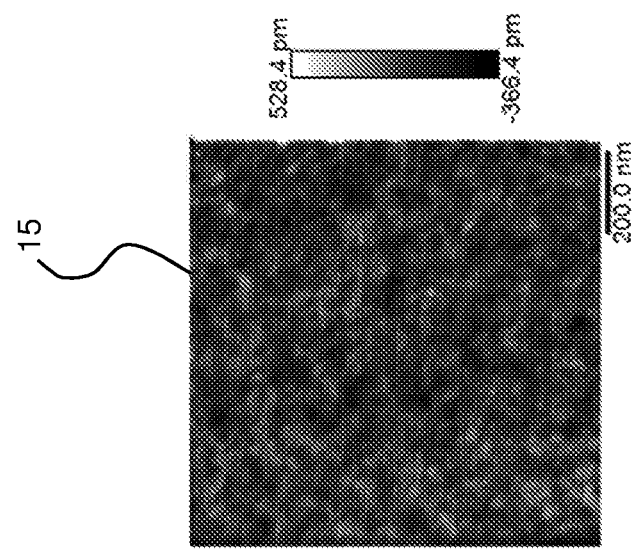
FIG. 6A is an atomic force microscope image of the surface topography of the same sample.

FIG. 6A is an atomic force microscope image of the surface topography of the same sample (prior to removing the top surfaces). The image has been created using a system in accordance with the present invention, but without the subsurface imaging, and shows the sample 15 of the sample 12 without any further subsurface structure. FIG. 6B is a subsurface image obtained using a method and system in accordance with the present invention, of the same sample illustrated in FIGS. 5A and 5B, prior to removal of the top layers for the creation of the image of FIG. 4. FIG. 6B clearly shows the stacks 82 of nanowires of the finFETs, which are buried 50 nanometer below the surface 15 of the sample. As follows from FIGS. 5A-B and 6A-B, the system and method of the present invention are well suitable for imaging of nanostructures buried within a semiconductor sample, such as to perform e.g. defect detection or overlay inspection during manufacturing of such semiconductor devices. The imaging technology of the present invention allows to perform such detection in a non-destructive manner and highly accurate at a high resolution.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A method of detecting structures of nanometer size semiconductor elements on or below the surface of a sample using a probe that comprises a cantilever and a probe tip, wherein the cantilever is characterized by one or more normal modes of resonance including a fundamental resonance frequency, wherein the method comprises:
    applying, using a transducer, a vibrational input signal exclusively from a location of the transducer; and
    sensing, while the probe tip is in contact with the surface of the sample, an output signal indicative of motion of the probe tip due to vibrations at the surface induced by the vibrational input signal,
    wherein the vibrational input signal comprises a first signal component having a frequency within a range of 10 megahertz to 10 gigahertz, and
    wherein the vibrational input signal is amplitude modulated using a second signal component having a modulation frequency below 5 megahertz.

2. The method according to claim 1, wherein the second signal component has a modulation frequency within a range of 20% from at least one of the normal modes of resonance of the cantilever.

3. The method according to claim 2, wherein the modulation frequency is a times the fundamental frequency, wherein a is within a range of 0.8 to 1.2.

4. The method according to claim 1, wherein the sensing the output signal comprises a step of measuring signal characteristics of the output signal at or near a measurement frequency.

5. The method according to claim 4, wherein the measurement frequency is taken from the group consisting of:
    within a range of 20% from at least one of the normal modes of resonance of the cantilever;
    b times the fundamental frequency of cantilever resonance, wherein b is within a range of 0.8 to 1.2; and
    equal to or within 5% from the modulation frequency.

6. The method according to claim 1, wherein the sensing the output signal comprises measuring signal characteristics of the output signal,
    wherein the signal characteristics includes at least one of the group consisting of: a phase, and an amplitude of the output signal.

7. The method according to claim 1, wherein the sample includes at least one of the group consisting of:
    a semiconductor structure embedded within the sample;
    a multilayer semiconductor structure or element; and
    a three dimensional semiconductor structure,
    wherein the structure is comprising structural features having at least one size dimension smaller than 10 nanometers.

8. A scanning probe microscopy system for detecting structures of nanometer size semiconductor elements on or below the surface of a sample, comprising:
    a probe for scanning the sample surface, wherein the probe comprises a probe tip mounted on a cantilever, wherein the cantilever is characterized by one or more normal modes of resonance including a fundamental resonance frequency, and wherein the probe is mounted on a sensing head arranged for bringing the probe tip in contact with the sampling surface;
    a transducer for applying a vibrational input signal exclusively from a location of the transducer; and
    a probe deflection sensor for producing an output signal indicative of motion of the probe tip due to vibrations at the surface induced by the vibrational input signal,
    wherein the transducer is configured for producing the vibrational input signal so as to comprise a first signal component having a frequency within a range of 10 megahertz to 10 gigahertz, and
    wherein the transducer is configured for amplitude modulating the vibrational input signal using a second signal component having a modulation frequency below 5 megahertz.

9. The scanning probe microscopy system according to claim 8, wherein the transducer, being configured for amplitude modulating the vibrational input signal using the second signal component, is configured for providing the second signal component with the modulation frequency being within a range of 20% from at least one of the normal modes of resonance of the cantilever.

10. The scanning probe microscopy system according to claim 9, wherein the transducer, being configured for amplitude modulating the vibrational input signal using the second signal component, is configured for providing the second signal component having with the modulation frequency being a times the fundamental frequency, wherein a is within a range of 0.8 to 1.2.

11. The scanning probe microscopy system according to claim 8, further comprising a controller or analyzer system in communicative connection with the probe deflection sensor,
    wherein the controller or analyzer system is configured for determining a signal characteristics of the output signal at or near a measurement frequency.

12. The scanning probe microscopy system according to claim 11, wherein the controller or analyzer system is configured for performing said determining of the signal characteristics of the output signal at the measurement frequency,
    wherein the measurement frequency is taken from the group consisting of:
        within a range of 20% from at least one of the normal modes of resonance of the cantilever;
        b times the fundamental frequency of cantilever resonance, wherein b is within a range of 0.8 to 1.2, preferably wherein b is within a range of 0.95 to 1.05, more preferably wherein b is 1.00; and
        equal to or within 5% from the modulation frequency.

13. The scanning probe microscopy system according to claim 8, further comprising a controller or analyzer system in communicative connection with the probe deflection sensor,
    wherein the controller or analyzer system is configured for determining signal characteristics of the output signal at or near a measurement frequency, and wherein said signal characteristics includes at least one of the group consisting of: a phase, and an amplitude of the output signal.

14. The scanning probe microscopy system according to claim 9, wherein the transducer, being configured for amplitude modulating the vibrational input signal using the second signal component, is configured for providing the second signal component having with the modulation frequency being a times the fundamental frequency, wherein a is within a range of 0.95 to 1.05.

15. The scanning probe microscopy system according to claim 9, wherein the transducer, being configured for amplitude modulating the vibrational input signal using the second signal component, is configured for providing the second signal component having with the modulation frequency being a times the fundamental frequency, wherein a is 1.00.

16. The method according to claim 2, wherein the modulation frequency is a times the fundamental frequency, wherein a is within a range of 0.95 to 1.05.

17. The method according to claim 2, wherein the modulation frequency is a times the fundamental frequency, wherein a is 1.00.

18. The method according to claim 1, wherein the vibrational input signal is applied to the sample during the applying.

19. The method according to claim 1, wherein the vibrational input signal is applied to the probe during the applying.

20. The system of claim 8, wherein the vibrational input signal is applied to the sample.

21. The system of claim 8, wherein the vibrational input signal is applied to the probe.

* * * * *